(12) United States Patent
Camp, Jr.

(10) Patent No.: US 8,339,317 B2
(45) Date of Patent: Dec. 25, 2012

(54) METHODS, SYSTEMS AND DEVICES FOR DETERMINING THE LOCATION OF A MOBILE DEVICE BASED ON SIMULCAST COMMUNICATION SIGNALS

(75) Inventor: William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1598 days.

(21) Appl. No.: 11/168,044

(22) Filed: Jun. 28, 2005

(65) Prior Publication Data

US 2007/0013584 A1 Jan. 18, 2007

(51) Int. Cl.
*G01S 3/02* (2006.01)
(52) U.S. Cl. ........................................ 342/458
(58) Field of Classification Search .................. 342/357, 342/126, 464
See application file for complete search history.

(56) References Cited

U.S. PATENT DOCUMENTS

| | | | | |
|---|---|---|---|---|
| 5,479,409 A | * | 12/1995 | Dupuy et al. | 370/337 |
| 6,169,903 B1 | * | 1/2001 | Dorenbosch et al. | 455/458 |
| 6,252,543 B1 | * | 6/2001 | Camp | 342/357.06 |
| 6,323,789 B1 | * | 11/2001 | Lawrence | 341/102 |
| 6,717,547 B2 | * | 4/2004 | Spilker et al. | 342/464 |
| 6,839,024 B2 | * | 1/2005 | Spilker et al. | 342/386 |
| 6,950,664 B2 | * | 9/2005 | Chen et al. | 455/456.5 |
| 7,126,536 B2 | * | 10/2006 | Rabinowitz et al. | 342/464 |
| 7,269,775 B2 | * | 9/2007 | Pendakur et al. | 714/748 |
| 2002/0135518 A1 | | 9/2002 | Rabinowitz et al. | |
| 2002/0144294 A1 | * | 10/2002 | Rabinowitz et al. | 725/139 |
| 2003/0052822 A1 | * | 3/2003 | Rabinowitz et al. | 342/464 |
| 2003/0174090 A1 | * | 9/2003 | Spilker et al. | 342/386 |
| 2004/0207556 A1 | * | 10/2004 | Spilker et al. | 342/464 |
| 2005/0002375 A1 | * | 1/2005 | Gokhale et al. | 370/347 |
| 2005/0030229 A1 | * | 2/2005 | Spilker, Jr. | 342/385 |
| 2005/0148346 A1 | * | 7/2005 | Maloney et al. | 455/456.6 |
| 2006/0130101 A1 | * | 6/2006 | Wessel van Rooyen | 725/100 |

OTHER PUBLICATIONS

"Digital Video Broadcasting (DVB); DVB-H Implementation Guidelines", *ETSI Standards, European Telecommunications Standards Institute* ETSI TR 102 377 v1.1.1:Chapter 4 (2005).
Notification of Transmittal of the International Search Report and the Written Opinion of the International Searching Authority, or the Declaration corresponding to PCT/US2006/000661 mailed on May 12, 2006.
Matthew Rabinowitz; *Positioning Using the ATSC Digital Television Signal*; Rosum Corporation, 2003.
DVB-H outline (AHG DVB TM-H), DVB-H185r3; Digital Video Broadcasting, DVD-Hgeneral.PPT/Sep. 12, 2003/jHenriksson pp. 1-36.
Michael Kornfeld; *DVB-H—The emerging standard for mobile data communication*, IEEE, 2004 pp. 193-198.
DVB-H—Mobile TV; Imagination Technologies 2005 pp. 1-5.
Matthew Rabinowitz; *A New Positioning System Using Television Synchronization Signals*; ROSUM pp. 1-11, IEEE, 2005.

* cited by examiner

*Primary Examiner* — Harry Liu
(74) *Attorney, Agent, or Firm* — Myers Bigel Sibley & Sajovec, P.A.

(57) ABSTRACT

A method for determining a position of a mobile device may include receiving a communication signal at the mobile device simulcast from a plurality of transmitters. One of the plurality of transmitters is identified based on information obtained from the received simulcast communication signal, and an identifiable signal associated with the identified one of the plurality of transmitters is received at the mobile device. A range of the identified one of the plurality of transmitters from the mobile device is determined based on the received identifiable signal.

23 Claims, 7 Drawing Sheets

METHODS, SYSTEMS AND DEVICES FOR DETERMINING THE LOCATION OF A MOBILE DEVICE BASED ON SIMULCAST COMMUNICATION SIGNALS

BACKGROUND OF THE INVENTION

The present invention relates to the field of communications in general, and more particularly, to determining the position of a mobile device.

It may be desirable, and in certain places mandated by law, that mobile telecommunication network providers be able to determine an approximate geographical location of a mobile terminal (MT), such as, for example, an actively communicating cellular telephone.

A variety of MT location techniques have been proposed. These location techniques include uplink signal location, downlink signal location, Global Positioning System (GPS) based approaches and approaches based on digital television signals. For "uplink signal" location techniques, the mobile telecommunications network is typically configured to determine where the MT is located based on ranging measurements associated with one or more uplink signals. These uplink signals are transmitted by the MT and received by a requisite number of receivers having known locations, such as, for example, cellular telephone base stations (BSs). For the "downlink signal" location techniques, the mobile telecommunications network is typically configured to determine where the MT is located based on ranging measurements associated with the reception, by the MT, of downlink signals from a requisite number of transmitters having known locations.

The other location approaches generally use location services not associated with either the uplink or downlink signals used in the mobile telecommunications network. In a typical GPS application, the GPS receivers collect and analyze ranging measurements from signals transmitted by GPS satellites having known locations. More specifically, a constellation of 24 satellites orbiting the earth continually emit a GPS radio signal. A GPS receiver, e.g., a hand-held radio receiver with a GPS processor, receives the radio signals from the closest satellites and measures the time that the radio signal takes to travel from the GPS satellites to the GPS receiver antenna. By multiplying the travel time by the speed of light, the GPS receiver can calculate a range for each satellite in view. Ephemeris information provided in the satellite radio signal typically describes the satellite's orbit and velocity, thereby generally enabling the GPS processor to calculate the position of the GPS receiver through a process of triangulation. It is known to include a GPS receiver in a mobile terminal to provide position location functionality to the mobile station.

The startup of a GPS receiver typically requires the acquisition of a set of navigational parameters from the navigational data signals of four or more GPS satellites. This process of initializing a GPS receiver may often take several minutes. The duration of the GPS positioning process is directly dependent upon how much information a GPS receiver has initially. Most GPS receivers are programmed with almanac data, which coarsely describes the expected satellite positions for up to one year ahead. However, if the GPS receiver does not have some knowledge of its own approximate location, then the GPS receiver cannot find or acquire signals from the visible satellites quickly enough, and, therefore, cannot calculate its position quickly. Furthermore, it should be noted that a higher signal strength is typically needed for capturing the C/A Code and the navigation data at start-up than is needed for continued monitoring of an already-acquired signal. It should also be noted that the process of monitoring the GPS signal may be significantly affected by environmental factors. Thus, a GPS signal which may be easily acquired in the open typically becomes harder to acquire when a receiver is under foliage, in a vehicle, or worst of all, in a building.

More recently, it has been proposed that digital television signals could be used for location of a mobile terminal. As described in "Positioning Using the ATSC Digital Television Signal," Rabinowitz, M. and Spilker, J., Rosum Corporation Whitepaper, www.rosum.com (circa 2001), digital television signals may be broadcast, at least in the United States, from terrestrial digital television transmitters having determinate locations. The Rosum Corporation Whitepaper, proposes a technique for determining range information to digital television transmitters using the synchronization fields of the digital television signal.

These various known location techniques may include collecting ranging measurements such as, for example, a time of arrival (TOA), a time difference of arrival (TDOA), an observed time difference (OTD), or the like. These ranging measurements are typically gathered by detecting one or more measurement features within the transmitted/received signal(s). Each of the various location techniques has certain limitations on their accuracy. By way of example, various TOA, TDOA, and OTD location techniques that utilize existing BSs typically require that at least three (3) or more BSs receive the transmitted uplink signal from the MT, or, conversely, that the MT receive transmitted downlink signals from at least three BSs to perform the locating process. Similarly, with respect to the GPS approach, a GPS receiver generally needs to receive transmitted signals from at least four (4) GPS satellites to perform the complete locating process (although some information may be generated based on transmitted signals received from three GPS satellites).

Moreover, there is not always a clear line-of-sight (LOS) between the MT and the requisite number of known location transmitter(s)/receiver(s). For example, in an urban environment, the LOS is often blocked by building and/or other structures, while in certain other environments the naturally occurring terrain and/or other features (e.g., mountains, canyons, forests, weather, etc.) can reduce the LOS, attenuate the transmitted signals, or produce multipath signals at the receiver. For many higher frequency signals or weaker signals, the loss of LOS or the introduction of such obstacles, can render the location technique significantly inaccurate, or completely unavailable.

SUMMARY OF THE INVENTION

According to some embodiments of the present invention, methods for determining a position of a mobile device may include receiving a communication signal at the mobile device simulcast from a plurality of transmitters. One of the plurality of transmitters may be identified based on information obtained from the received simulcast communication signal, and an identifiable signal may be received that is associated with the identified one of the plurality of transmitters. A range of the identified one of the plurality of transmitters from the mobile device may be determined based on the received identifiable signal.

In some embodiments of the present invention, the information obtained from the received simulcast communication signal may include identification information associated with the one of the plurality of transmitters. For example, the identification information may include a timeslot and/or code information associated with the one of the plurality of transmitters. The information obtained from the received simulcast communication signal may further include identification information associated with additional ones of the plurality of transmitters.

In other embodiments of the present invention, the identification information may include a timeslot, and one of the plurality of transmitters may be identified by associating the timeslot with the one of the plurality of transmitters. The identifiable signal may be received from the identified one of the plurality of transmitters during the timeslot.

In some embodiments of the present invention, the information obtained from the received simulcast communication signal may include identification information associated with a first one of the plurality of transmitters and identification information associated with a second one of the plurality of transmitters. The identification information associated with the first one of the plurality of transmitters may include a first timeslot associated therewith, and the identification information associated with the second one of the plurality of transmitters may include a second timeslot associated therewith. The first and second timeslots may be associated with the first and second ones of the plurality of transmitters. An identifiable signal may be received from the first one of the plurality of transmitters during the first timeslot, and an identifiable signal may be received from the second one of the plurality of transmitters during the second timeslot. A range of the first one of the plurality of transmitters from the mobile device may be determined based on the received identifiable signal from the first one of the plurality of transmitters, and a range of the second one of the plurality of transmitters from the mobile device may be determined based on the received identifiable signal from the second one of the plurality of transmitters.

In other embodiments of the present invention, the identification information may include code information, and one of the plurality of transmitters may be identified by associating the code information with the one of the plurality of transmitters. A range of the identified one of the plurality of transmitters from the mobile device may be determined based on the code information.

In some embodiments of the present invention, the information obtained from the received simulcast communication signal may include identification information associated with the first one of the plurality of transmitters and identification information associated with a second one of the plurality of transmitters. The identification information associated with the first one of the plurality of transmitters may include first code information associated therewith, and the identification information associated with the second one of the plurality of transmitters may include second code information associated therewith. The obtained first and second code information may be associated with the first and second ones of the plurality of transmitters, and an identifiable signal may be received from each of the first and second ones of the plurality of transmitters. A range of the first one of the plurality of transmitters from the mobile device may be determined based on the obtained first code information, and a range of the second one of the plurality of transmitters from the mobile device may be determined based on the obtained second code information.

In other embodiments of the present invention, first and second identifiable signals may be respectively received from the first and second ones of the plurality of transmitters during a common timeslot as a ranging signal. The range of the first one of the plurality of transmitters from the mobile device may be determined using the first code information based on the received ranging signal, and the range of the second one of the plurality of transmitters from the mobile device may be determined using the second code information based on the received ranging signal.

In some embodiments of the present invention, the information obtained from the received simulcast communication signal may further include range assistance information. The range assistance information may include location and/or time correction data for the one of the plurality of transmitters. A range of the identified one of the plurality of transmitters from the mobile device may be determined based on the received identifiable signal and the range assistance information.

In other embodiments of the present invention, the range assistance information including location and/or time correction data for the identified one of the plurality of transmitters may be obtained from the received identifiable signal.

In some embodiments of the present invention, the simulcast communication signal may be a simulcast digital television signal. For example, the simulcast digital television signal and the identifiable signal may be digital video broadcasting-handhelds (DVB-H) protocol signals, and the identifiable signal may be received during an unallocated timeslot of the DVB-H protocol.

In some embodiments of the present invention, the determined range may be transmitted from the mobile device to a location server. The position of the mobile device may be calculated at the location server using at least three range values including the determined range from the mobile device to provide a position estimate based on the DVB-H protocol signal.

In other embodiments of the present invention, the DVB-H protocol signal and a GPS communication signal may be received at the mobile device during respective distinct timeslots using a common receiver without retuning an antenna circuit associated therewith. The information obtained from the received simulcast communication signal may further include GPS assistance information. The position of the mobile terminal may be estimated based on the DVB-H protocol signal and the GPS communication signal.

In some embodiments of the present invention, methods for determining a position of a mobile device may include simulcasting the communication signal from the plurality of transmitters, and transmitting the identifiable signal from the one of the plurality of transmitters. The simulcast communication signal may designate a timeslot associated with the one of the plurality of transmitters, and the identifiable signal may be transmitted from the one of the plurality of transmitters during the timeslot. In other embodiments, the simulcast communication signal may designate code information associated with the one of the plurality of transmitters, and the identifiable signal may be transmitted from the one of the plurality of transmitters based on the code information.

In other embodiments according to the present invention, methods for determining a position of a mobile device may include simulcasting a communication signal including identification information therein from a plurality of transmitters during a common timeslot determined by a communications protocol. Respective identifiable signals may be transmitted from the plurality of transmitters during at least one unallocated timeslot of the communications protocol.

In some embodiments of the present invention, the identification information may include distinct code information and/or timeslots of the communications protocol respectively associated with ones of the plurality of transmitters. For example, when the identification information includes the distinct timeslots, the respective identifiable signals may be transmitted from the ones of the plurality of transmitters during the associated distinct timeslots. In other embodiments, when the identification information includes the distinct code information, the respective identifiable signals may be transmitted from the ones of the plurality of transmitters during the at least one unallocated timeslot based on the associated distinct code information.

In other embodiments of the present invention, the simulcast communication signal may include range assistance information therein including location and/or time correction data respectively associated with the ones of the plurality of transmitters. Range assistance information including location and/or time correction data respectively associated with the plurality of transmitters may also be transmitted along with the respective identifiable signals. The respective identifiable signals may be transmitted from the plurality of transmitters at a different duty factor than the simulcast communication signal.

According to some embodiments of the present invention, a mobile device may include a receiver configured to receive a communication signal simulcast from a plurality of transmitters. The receiver may be further configured to receive an identifiable signal associated with one of the plurality of transmitters. The mobile device may further include a controller configured to identify the one of the plurality of transmitters based on information obtained from the received simulcast communication signal. The controller may be further configured to determine a range of the one of the plurality of transmitters from the mobile device based on the received identifiable signal.

In some embodiments of the present invention, the controller may be configured to obtain identification information including a timeslot and/or code information associated with the one of the plurality of transmitters from the received simulcast communication signal. For example, the identification information may include the timeslot associated with the one of the plurality of transmitters. The controller may be further configured to associate the timeslot with the one of the plurality of transmitters and activate the receiver during the timeslot to receive the identifiable signal from the identified one of the plurality of transmitters.

In other embodiments of the present invention, the identification information may include the code information associated with the one of the plurality of transmitters. The controller may be further configured to associate the code information with the one of the plurality of transmitters and determine the range of the one of the plurality of transmitters based on the code information.

In some embodiments of the present invention, the controller may be further configured to obtain range assistance information including location and/or time correction data for the one of the plurality of transmitters from the received simulcast communication signal. The controller may also be configured to determine the range based on the received identifiable signal and the range assistance information. The controller may be further configured to obtain the range assistance information including location and/or time correction data for the identified one of the plurality of transmitters from the received identifiable signal.

In some embodiments of the present invention, the simulcast communication signal may be a simulcast digital television signal. For example, the simulcast digital television signal and the identifiable signal may be digital video broadcasting-handhelds (DVB-H) protocol signals. The controller may be configured to activate the receiver during an unallocated timeslot of the DVB-H protocol to receive the identifiable signal.

According to further embodiments of the present invention, a system for determining a position of a mobile device may include a plurality of transmitters configured to simulcast a communication signal including identification information therein during a common timeslot determined by a communications protocol. The transmitters may further be configured to transmit respective identifiable signals during at least one unallocated timeslot of the communications protocol.

In some embodiments of the present invention, the identification information may include distinct code information and/or timeslots of the communications protocol respectively associated with ones of the plurality of transmitters. For example, in some embodiments, the identification information may include the distinct timeslots, and the ones of the plurality of transmitters may be further configured to transmit respective identifiable signals during the associated distinct timeslots. In other embodiments, the identification information may include the distinct code information, and the ones of the plurality of transmitters may be further configured to transmit the respective identifiable signals during the at least one unallocated timeslot of the communications protocol based on the associated distinct code information.

In other embodiments of the present invention, the simulcast communication signal may further include range assistance information therein including location and/or time correction data respectively associated with the ones of the plurality of transmitters. The respective identifiable signals may also include range assistance information including location and/or time correction data respectively associated with the plurality of transmitters.

In some embodiments of the present invention, the simulcast communication signal may be a simulcast digital television signal, and the communications protocol may be a digital television protocol. For example, the simulcast digital television signal may be a simulcast digital video broadcasting-handhelds (DVB-H) protocol signal, and the communications protocol may be a DVB-H protocol. The system may further include a location server configured to calculate the position of the mobile device using at least three range values received from the mobile terminal to provide a position estimate based on the DVB-H protocol signal.

DETAILED DESCRIPTION OF THE INVENTION

Figure 1:
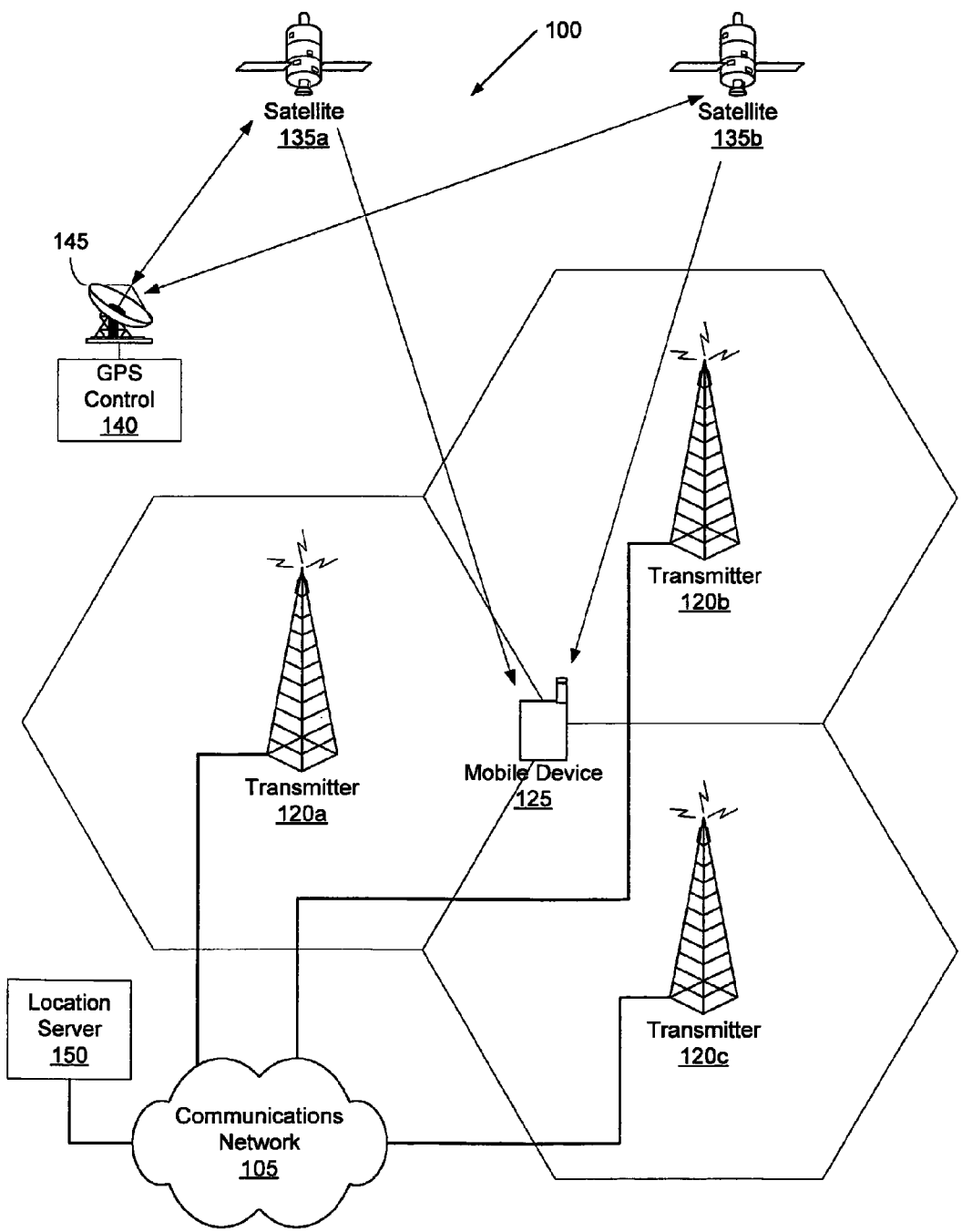
FIG. 1 is a schematic block diagram illustrating systems, methods, and devices for determining the location of a mobile device based on simulcast communication signals according to some embodiments of the present invention.

The present invention now will be described more fully hereinafter with reference to the accompanying drawings, in which illustrated embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items, and may be abbreviated as "/".

It will also be understood that, although the terms first, second, etc. may be used herein to describe various elements, these elements should not be limited by these terms. These terms are only used to distinguish one element from another. For example, a first receiving station could be termed a second receiving station, and, similarly, a second receiving station could be termed a first receiving station without departing from the teachings of the disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the present invention may be embodied as methods, systems, or devices. Accordingly, the present invention may be embodied in hardware and/or in software (including firmware, resident software, micro-code, etc.). Computer program code for carrying out operations of the present invention may be written in an object oriented programming language such as Java®, Smalltalk or C++, a conventional procedural programming languages, such as the "C" programming language, or lower-level code, such as assembly language and/or microcode. The program code may execute entirely on a single processor and/or across multiple processors, as a stand-alone software package or as part of another software package.

The present invention is described below with reference to flowchart illustrations and/or block and/or flow diagrams of methods, systems, and devices according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block and/or flow diagram block or blocks.

These computer program instructions may also be stored in a computer-readable memory that can direct a computer or other programmable processor to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processor to cause a series of operational steps to be performed on the computer or other programmable processor to produce a computer implemented process such that the instructions which execute on the computer or other programmable processor provide steps for implementing the functions or acts specified in the flowchart and/or block diagram block or blocks.

In accordance with certain embodiments of the present invention, a mobile device, such as, for example, an actively communicating cellular telephone, is located using a simulcast communication signal, such as a digital video broadcasting-handheld (DVB-H) protocol signal. Digital Video Broadcasting for Handhelds (DVB-H) is a digital TV service that may be implemented in mobile devices in the near future. DVB-H systems may simulcast the same content over multiple transmitters (such as repeaters) on the same frequency in a given location. DVB-H systems may transmit signals using Orthogonal Frequency Division Multiplexing. As such, receivers in a DVB-H system may tolerate many time shifted variants of the same signal entering the receiver. Also, the DVB-H standard provides for time-slicing of content on the basic carrier, which may permit the receiver to operate at a fractional duty factor in order to save power.

By way of background, some embodiments of the present invention may employ location techniques having certain characteristics in common with conventional location techniques. For example, location may be estimated by collecting a requisite number of ranging measurements from signals passed between transmitter(s) and receiver(s), wherein either the transmitter(s) or the receiver(s) have known or determinable locations (i.e., positions). Further, each of the collected ranging measurements can generally be converted from a time interval measurement to a corresponding distance measurement, for example, by multiplying by the speed of light or an expected speed of transmission associated with the signal. When the conversion from time to distance has been accomplished, traditional triangulation, or other like mathematical techniques, can be used to determine the positional coordinates of the mobile device, based on the known locations and calculated distances.

For example, in the case of a GPS location technique, the positions of the GPS satellites vary with regard to time. Thus, a GPS receiver generally needs to receive an accurate measurement of time from the GPS satellites (or an accurate GPS-related source on the ground) in order to know the positions of the GPS satellites at the time of the ranging measurements. The ranging measurements between the GPS receiver and each of at least four (4) GPS satellites occurs by: 1) finding the starting point on the 1023 chip long Gold code sequence within the signal transmitted by each GPS satellite; 2) finding the start time of a bit edge; and 3) finding the start time of the data message. The resulting "time of flight" for the signal received from each GPS satellite is then converted to distance. The resulting four (4) range measurements allow for a solution to the GPS receiver's position in x, y and z coordinates and for determination of the unknown time difference between the GPS time and the GPS receiver's independent clock.

Thus, the underlying location process generally uses signals received from certain known positions, and determines ranging measurements from a sufficient number of signals to solve for the mobile device's location. These common characteristics and others will be described in more detail below to show how the present invention may advantageously provide location using simulcast communication signals. Further discussion of mathematical solutions suitable for use with embodiments the present invention are provided in U.S. Pat. No. 6,252,543, which is incorporated herein by reference as if set forth in its entirety. Those skilled in the art will further recognize that the methods, systems and devices in accordance with the present invention can, therefore, be adapted for use in combining a simulcast communication signal based approach with a variety of different types of mobile devices, other system's transmitters, and/or special purpose transmitters.

FIG. 1 is a schematic block diagram illustrating systems, methods, and devices for determining the location of a mobile device based on simulcast communication signals according to some embodiments of the present invention. Referring now to FIG. 1, a communications system 100 includes a communications network 105, a plurality of transmitters 120a-120c coupled thereto, and a mobile device 125. The system 100 may further include a plurality of satellites, for example, GPS satellites 135a and 135b. The GPS satellites 135a and 135b may be controlled by a GPS control unit 140 via a satellite dish 145. The communication system 100 may further include a plurality of servers, such as location server 150, coupled to the communication network 105.

The plurality of transmitters 120a-120c are configured to simulcast a communication signal during a common timeslot according to a communications protocol. As used herein, "simulcasting" refers to one-way broadcasting of communication signals, such as digital television signals, from one or more transmitting stations to one or more receiving stations. The simulcast communication signals from the transmitters 120a-120c are received at the mobile device 125. More specifically, the mobile device 125 may be configured to receive the simulcast communication signals from the transmitters 120a-120c as a combined received simulcast communication signal. As such, the mobile device need not distinguish between the simulcast communication signals from the transmitters 120a-120c. Moreover, where the communication signals simulcast from the transmitters 120a-120c are relatively weak when received at the mobile device 125, the signal power may be combined at the mobile device 125 to provide a received simulcast communication signal with sufficient signal strength. Also, although some of the communication signals may arrive at the mobile device 125 time-shifted relative to others, such a time-shift may be minimal relative to the data rate.

The simulcast communication signals may include an identifier and/or identification information, such as distinct code information and/or timeslots of the communications protocol, that is associated with one or more of the transmitters 120a-120c. The transmitters 120a-120c are further configured to transmit respective identifiable signals during at least one unallocated timeslot of the communications protocol.

For example, the identification information from the simulcast communication signal may include distinct timeslots respectively associated with each of the transmitters 120a-120c. As such, each of the transmitters 120a-120c may be configured to transmit a respective identifiable signal during the distinct timeslot that is associated with that transmitter. In other embodiments, the identification information from the simulcast communication signal may include distinct code information respectively associated with each of the transmitters 120a-120c. As such, each of the transmitters 120a-120c may be configured to transmit a respective identifiable signal using the distinct code information associated with that transmitter during at least one unallocated timeslot of the communications protocol.

In order to aid in determining the location of the mobile device 125, the simulcast communication signal and/or the identifiable signals from each of the transmitters 120a-120c may include range assistance information, such as location and/or time correction data, that is associated with each of the transmitters 120a-120c. The range assistance information may be used, in addition to the received identifiable signals, to determine the respective ranges of the transmitters 120a-120c from the mobile device 125. For example, where a "time-of-flight" location technique is used, the ranging measurements may be computed by having the mobile device 125 separately measure a time-of-flight for each identifiable signal transmitted from the transmitters 120a-120c using the time correction data for each of the transmitters 120a-120c. The time correction data may be relative to the GPS system or GMT/UTC time. Each measured time-of-flight can be converted to a distance/range value by multiplying by an expected rate of transmission associated with each identifiable signal. Assuming that the mobile device 125 is positioned within a relatively planar environment, distance information from three (3) transmitters is generally required to solve for x and y positional coordinates on the ground using traditional triangulation or other like mathematical techniques, based on the location data for each of the transmitters 120a-120c and the calculated distances. In other embodiments, the location data for the transmitters 120a-120c may be known by the mobile device 125 in advance, as the data may not change over time.

In some embodiments, the simulcast communication signals may be simulcast digital television signals, and the communications protocol may be a digital television protocol. For instance, the communications protocol may be a digital video broadcasting—handheld (DVB-H) protocol and the simulcast digital television signals may be simulcast DVB-H protocol signals. As such, the mobile device 125 may be configured to determine a range of one of the transmitters 120a-120c from the mobile device 125 based on the simulcast DVB-H protocol signals, which may include one or more identifiable signals from one or more of the respective transmitters 120a-120c. Where the transmitters 120a-120c simulcast a DVB-H protocol signal, the transmitters 120a-120c may be one-way broadcast transmitters that do not receive feedback from the mobile device 125, so that, at a given point in time, the communications network 105 and/or the transmitters 120a-120c do not have knowledge of whether a given packet was or was not received successfully at the mobile device 125.

The mobile device 125 may be further configured to transmit the determined range from one of the transmitters 120a-120c to the location server 150. For example, the determined range may be transmitted from the mobile device 125 to the location server 150 using an IP bearer over a cellular connection. The location server 150 may be configured to calculate the position of the mobile device 125 using at least three range values received from the mobile device 125 in order to provide a position estimate based on the DVB-H protocol signals.

In addition, the mobile device 125 may be configured to receive GPS communication signals from the GPS satellites 135a and/or 135b. In some embodiments, the simulcast communication signals from the transmitters 120a-120c may also include GPS assistance information. As such, the position of the mobile device 125 may be estimated based on both the DVB-H protocol signals and/or the GPS communication signals.

Although the communications system 100 has been described with reference to specific elements as shown in FIG. 1, communication systems according to embodiments of the present invention are not limited to the elements illustrated therein and may include additional elements which may be configured to perform the operations and/or functions described herein. For example, although illustrated as coupled to the communications network 105, the transmitters 120a-120c may be independent digital television transmitters and/or repeater transmitters configured to perform the operations and/or functions described herein.

Figure 2:
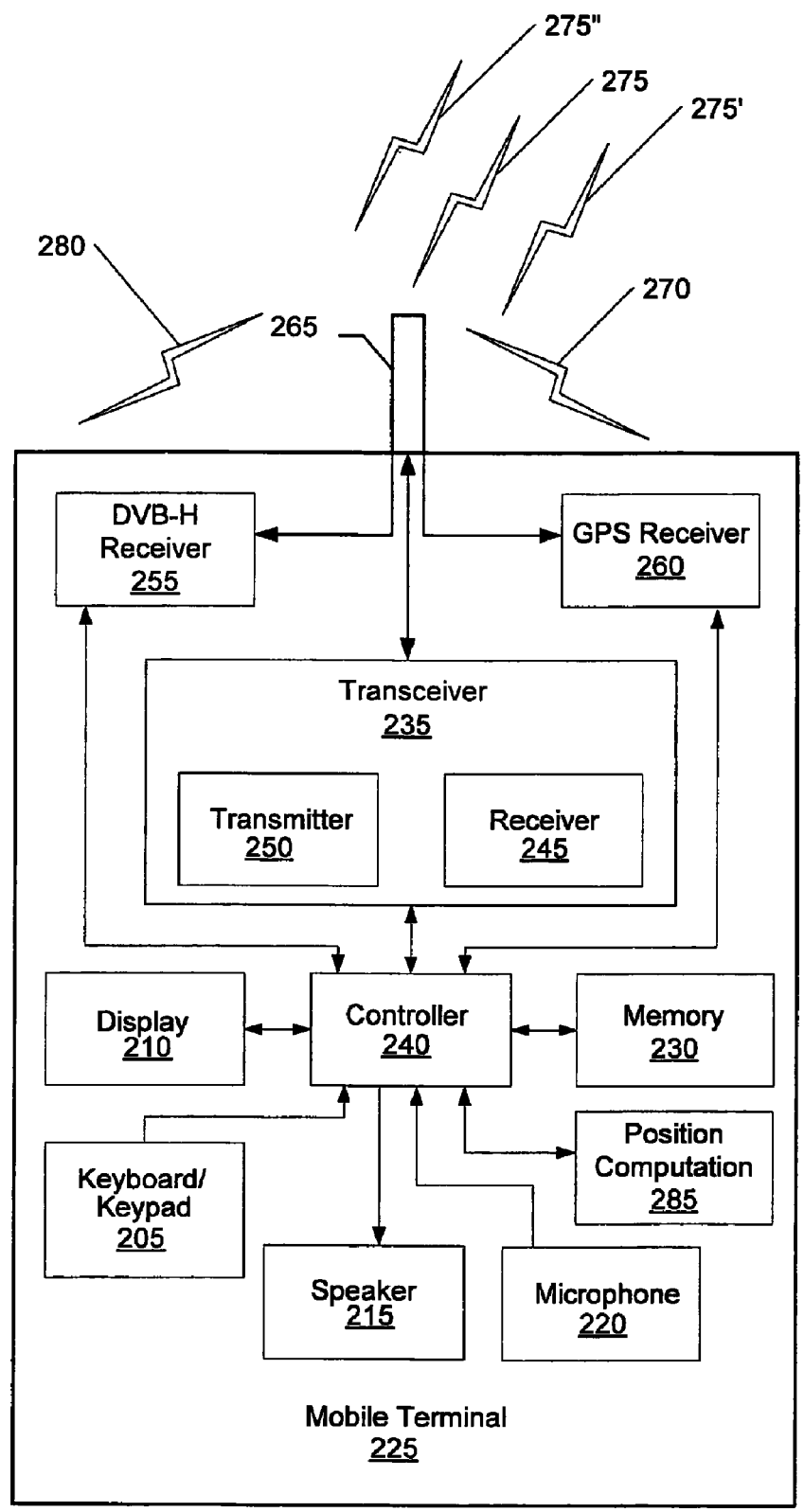
FIG. 2 is a schematic block diagram illustrating a mobile device according to some embodiments of the present invention.

FIG. 2 is a schematic block diagram illustrating a mobile terminal 225 according to some embodiments of the present invention. In some embodiments, the mobile terminal 225 may correspond to the mobile device 125 illustrated in FIG. 1. Referring now to FIG. 2, the mobile terminal 225 may include a keyboard/keypad 205, a display 210, a speaker 215, a microphone 220, a transceiver 235 and a memory 230 that communicate with a controller 240. The transceiver 235 may typically include a transmitter circuit 250 and a receiver circuit 245, which respectively transmit outgoing radio frequency signals and receive incoming radio frequency signals via an antenna 265. While a single antenna 265 is shown in FIG. 2, it should be understood that multiple antennas and/or different types of antennas may be utilized based on the types of signals being received. The radio frequency signals may include both traffic and control signals (e.g., paging signals/messages for incoming calls), which may be used to establish and maintain communication with another party or destination. However, the present invention is not limited to such two way communication systems, and may only be configured to receive signals defined by a simulcast communications protocol, such as DVB-H signals.

The foregoing components of the mobile terminal 225 may be included in many conventional mobile terminals and their functionality is generally known to those skilled in the art. It should be further understood that, as used herein, the term mobile terminal may include a cellular radiotelephone with or without a multi-line display; a personal communications system (PCS) terminal that may combine a cellular radiotelephone with data processing, facsimile and/or data communications capabilities; a personal data assistant (PDA) that can include a radiotelephone, pager, Internet/intranet access, web browser, organizer, calendar and/or global positioning system (GPS) receiver; and a conventional laptop and/or palmtop receiver or other appliance that includes a radiotelephone transceiver. Mobile terminals may be also referred to as "pervasive computing" devices.

Still referring to FIG. 2, the mobile terminal receiver 245 may be configured to receive communication signals that are simulcast from a plurality of transmitters, such as the transmitters 120a-120c of FIG. 1, as a simulcast communication signal 270. The receiver 245 may be further configured to receive one or more identifiable signals respectively associated with one or more of the transmitters. The mobile terminal controller 240 may be configured to identify one or more of the transmitters based on information obtained from the received simulcast communication signal 270, and may be further configured to determine a range of one or more of the identified transmitters from the mobile device 125 based on one or more received identifiable signals 275, 275', and 275".

For example, the controller 240 may be configured to obtain identification information such as timeslot and/or code information associated with one of the transmitters from the received simulcast communication signal 270. Where the identification information includes timeslot information, the controller 240 may be configured to associate the timeslot with the corresponding one of the transmitters and activate the receiver 245 during the specified timeslot to receive the identifiable signal 275 from the transmitter. The controller 240 may determine the range of the transmitters from the mobile terminal 225 based on the identifiable signal 275 received during the timeslot. The controller 240 may similarly be configured to determine the range of other transmitters from the mobile terminal 225 based on identifiable signals 275' and 275" received by activating the receiver 245 during respective other timeslots obtained from the received simulcast communication signal 270 and associated with the other transmitters.

Where the identification information includes code information, the controller 240 may be configured to associate the code information with the corresponding one of the transmitters. Upon receiving the identifiable signal 275 at the receiver 245, the controller 240 may recognize the identifiable signal 275 and determine the range of the transmitter from the mobile terminal 225 based on the code information. The controller 240 may be further configured to repeat the above operations on the received identifiable signal 275 based on the code information of other transmitters to recognize and determine the range of the other transmitters from the mobile terminal 225.

As further shown in FIG. 2, the mobile terminal 225 may also include a digital television receiver, such as DVB-H receiver 255, and/or a GPS receiver 260. Although illustrated as distinct blocks in FIG. 2, the DVB-H receiver 255, the GPS receiver 260 and/or the receiver 245 may be implemented in a single module. The DVB-H receiver 255, in cooperation with the controller 240, can provide a digital television signal processing circuit configured to process conventional DVB-H protocol signals and/or other digital television signals received from digital television transmitters, such as the transmitters 120a-120c of FIG. 1. The DVB-H receiver 255 may further include or be associated with a tuner that provides the received DVB-H protocol signals to a monitor, such as the display 210, for viewing. As such, when the simulcast communication signal 270 and the identifiable signal 275 are DVB-H protocol signals, the controller 240 may be configured to activate the DVB-H receiver 255 during one or more particular timeslots specified by the DVB-H protocol to receive the simulcast communication signal 270. In addition, the controller 240 may be further configured to activate the DVB-H receiver 255 during a previously unallocated time slot of the DVB-H protocol in order to receive the identifiable signal 275. The DVB-H protocol signals, including the identifiable signal 275 and the simulcast signal 270, may then be used to determine a range of one of the transmitters from the mobile terminal 225.

In some embodiments, the communication signals simulcast from the transmitters and/or the identifiable signal(s) 275 may include range assistance information, such as location and/or time correction data, for one or more of the transmitters. For example, the controller 240 may be configured to obtain the range assistance information from the simulcast signal 270 during demodulation of the simulcast signal 270. The controller 240 may determine the range of one or more of the transmitters using the associated location and time correction data in addition to the time-of-flight of one or more of the received identifiable signals 275 associated with each transmitter. As such, the controller 240 may be configured to determine the range of one or more transmitters based on both the identifiable signal 275 and the simulcast signal 270 without demodulating the identifiable signal 275. In other embodiments, the controller 240 may be configured to obtain the range assistance information for one or more of the transmitters from the associated identifiable signals 275 by demodulating the identifiable signals 275. Thus, the controller 240 may be configured to determine the range of one or more of the transmitters based only on the received identifiable signals 275. In addition, the range assistance information obtained from the simulcast communication signal 270 and/or the identifiable signal 275 may further include measured signal strength data, such as effective radiated power (ERP) and/or tower height of the associated transmitter, for use in more advanced location functions.

The mobile terminal 225 may further include a position computation circuit 285 that is configured to estimate a position of the mobile terminal 225 based on determined range estimates received from the controller 240. In some embodiments, the position computation circuit 285 may be configured to provide the resulting range estimates to a remote position determination server, such as the location server 150 of FIG. 1, via the transmitter 250. In other embodiments, the position computation circuit 285 may perform the calculations to estimate the position of the mobile terminal 225 at the mobile terminal 225 itself. While the position computation circuit 285 and the controller 240 are illustrated as distinct blocks in FIG. 2, it is to be understood that the functionality of these blocks may be combined into a single controller and/or spread across a plurality of different controllers and/or other hardware configured to operate in a manner described herein.

The mobile terminal 225 may also include a GPS receiver 260. The GPS receiver 260, in cooperation with the controller 240, may provide a processing circuit configured to process ranging signals 280 received from GPS satellites, such as the GPS satellites 135a and 135b of FIG. 1. As such, the controller 240 may be configured to estimate the position of the mobile terminal 225 based on both received DVB-H protocol signals and/or GPS communication signals. In some embodiments, the information obtained from the simulcast communication signal 270 may include GPS assistance information, such as satellites in view, approximate location, accurate time signals and/or ephemeris data for the satellites.

Moreover, as mentioned above, the DVB-H receiver 255, the GPS receiver 260 and the receiver 245 may be implemented in a single module. As such, the mobile terminal 225 may be configured to receive both DVB-H protocol signals and GPS communication signals during respective distinct timeslots using a common receiver. For instance, for DVB-H channels at 1670 MHz, the receiver may be time-shared between GPS reception and DVB-H reception without retuning an associated antenna circuit, as this DVB-H frequency is close to the 1570 MHz GPS frequency.

Although the present invention may be embodied in communication systems and/or devices such as the mobile terminal 225 of FIG. 2, the present invention is not limited to such devices and/or systems. Instead the present invention may be embodied in any method, communication device, communication system, or computer program product configured to receive simulcast communication signals, including digital television signals, that may be suitable for use in ranging measurements.

Figure 3A:
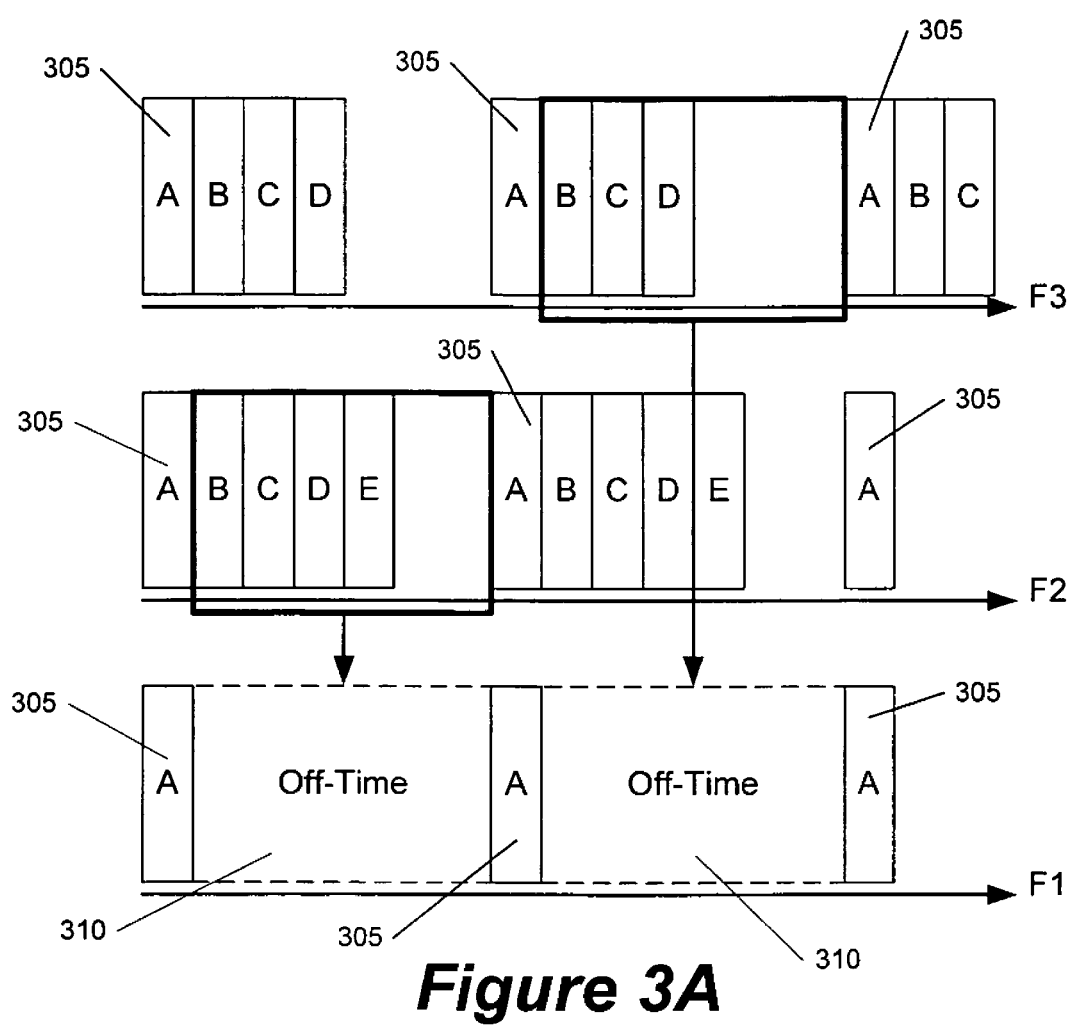
FIGS. 3A-3C are diagrams illustrating data that is simulcast from multiple transmitters according to some embodiments of the present invention.
Figure 3B:
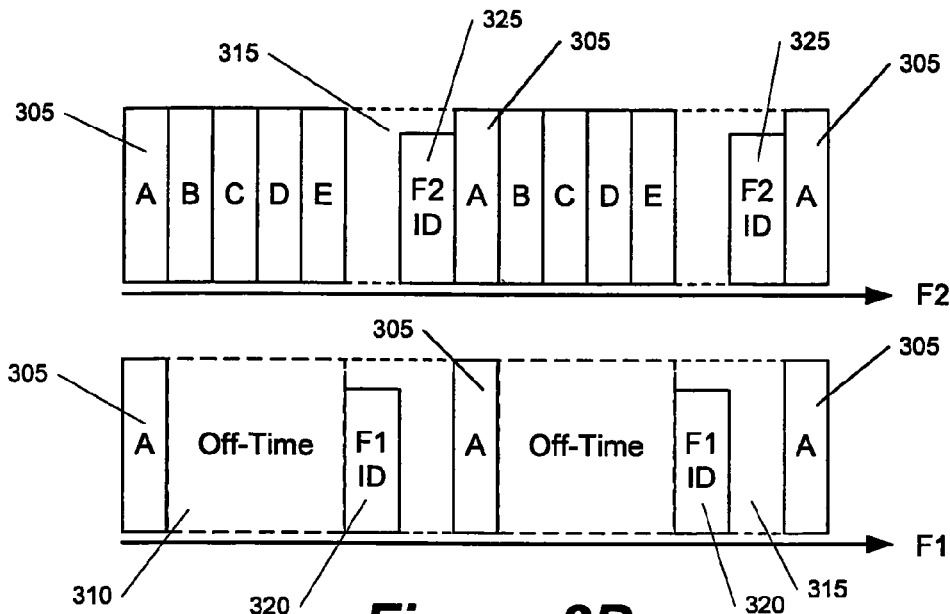
Figure 3C:
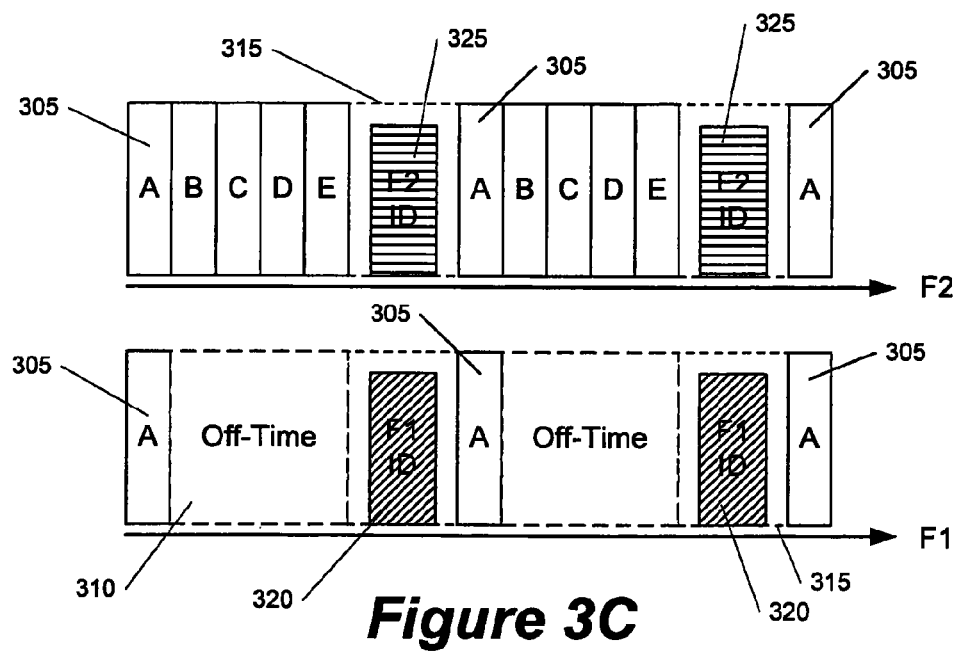

FIGS. 3A to 3C illustrate communication signals that are simulcast from a plurality of different transmitters, such as the transmitters 120a-120c of FIG. 1. Referring now to FIG. 3A, communication signal A is simulcast by multiple transmitters F1, F2 and F3 on the same frequency in a given location. For example, the transmitters F1, F2 and F3 may be digital television transmitters, and communication signal A may be a simulcast digital television signal. Although transmission of communication signal A from transmitters F1, F2, and F3 is synchronized, reception of communication signal A from one or more of the transmitters at a mobile device, such as mobile terminal 225 of FIG. 2, may be time-shifted. However, such a time-shift may be negligible in relation to an overall data rate according to some embodiments of the present invention.

Still referring to FIG. 3A, communication signal A is simulcast from transmitters F1 and F2 in bursts 305 during a common timeslot. Each burst 305 may include a notification of when the next burst will be transmitted. The simulcast communication signal A may also include identification information for the transmitters, such as distinct code information and/or timeslots respectively associated with each of the transmitters, according to a particular communications protocol. For example, the identification information may be included in an initial one of the bursts 305 of the simulcast communication signal A. The communications protocol may set aside a fixed and/or variable percentage of bandwidth to be used for sending the identification information when necessary or desirable.

For transmitter F1, transmission of communication signal A includes a time period between bursts 305, illustrated as off-time 310. The off-time 310 may provide power savings for a mobile device, such as mobile terminal 225 of FIG. 2, that may receive communication signal A from transmitter F1. More particularly, a mobile device receiver may be activated to receive the bursts 305 of communication signal A during the specified timeslots, and as such, may be deactivated during the off-time 310. In some embodiments, by time-slicing and transmitting communication signal A in high data rate bursts 305, the receiver of a mobile device may be powered-down for up to 95% of the time that the device is in use, thereby reducing its average power consumption. In addition, the mobile device receiver may use the off-time 310 to monitor the current and/or neighboring cells and/or transmitters. As a further example, the off-time 310 may be used to make ranging measurements.

As shown in FIGS. 3B and 3C, the off-time 310 may also include at least one unallocated timeslot 315 designated by the particular communications protocol. As such, identifiable signals from each of the transmitters may be transmitted during the unallocated timeslot 315. For example, as shown in FIG. 3B, where the simulcast communication signal A includes timeslot information, identifiable signals 320 and 325 may be transmitted during respective distinct timeslots of the unallocated timeslot 315 as designated by the information contained in communication signal A.

Where the identification information includes code information, as shown in FIG. 3C, the identifiable signals 320 and 325 may be concurrently transmitted during the unallocated timeslot 315 by each transmitter using the distinct code information. In some embodiments, the identifiable signals 320 and 325 may be transmitted from transmitters F1 and F2 at a different duty factor than the simulcast communication signal 305. In other words, the identifiable signals 320 and 325 may be broadcast more or less often (at a higher or lower frequency for uniform periodicity) than the simulcast communication signal 305.

Figure 4A:
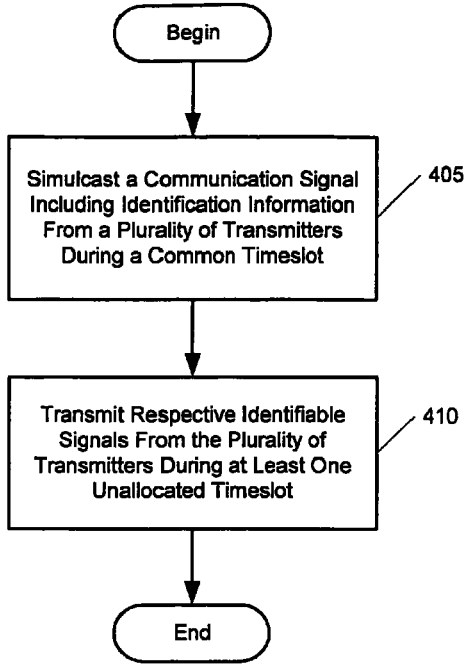
FIGS. 4A and 4B are flowcharts illustrating operations for determining the location of a mobile device based on simulcast communication signals according to some embodiments of the present invention.
Figure 4B:
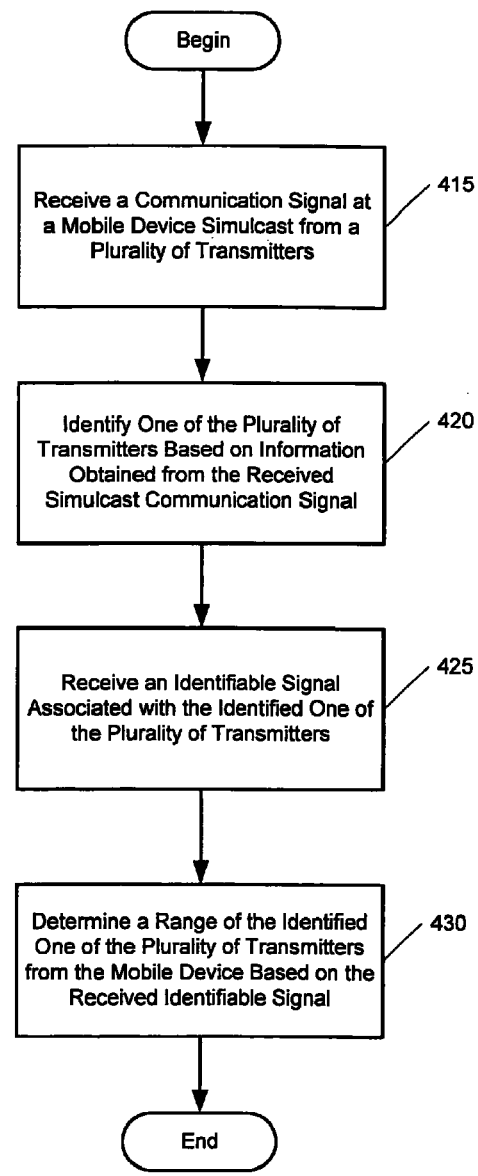

FIGS. 4A and 4B are flowcharts illustrating operations for determining the location of a mobile device according to some embodiments of the present invention. More particularly, FIG. 4A illustrates operations that may be carried out by a transmitter, such as one of the transmitters 120a-120c of FIG. 1. As shown in FIG. 4A, a communications signal is simulcast from a plurality of transmitters during a common timeslot according to a particular communications protocol (Block 405). The simulcast communications signals may include identification information, such as distinct code information and/or timeslots of the communications protocol associated with the plurality of transmitters. Also, respective identifiable signals are transmitted from the plurality of transmitters during at least one unallocated timeslot of the communications protocol (Block 410).

For example, where the identification information includes a distinct timeslot associated with each of the transmitters, an identifiable signal may be transmitted from each of the transmitters during its distinct timeslot. The distinct timeslots may correspond to unallocated timeslots of the communications protocol. However, where a large number of transmitters are present, it may not be feasible to associate a distinct timeslot with each transmitter, as the total number of unallocated timeslots may be limited. As such, timeslots may be re-used by different transmitters that are sufficiently remote from each other. The timeslots may be re-used according to any scheme that may minimize the probability of reception of more than one identifiable signal in a timeslot, such as protocols utilized for channel re-use in cellular telephone systems.

In addition, where the identification information includes distinct code information associated with each of the transmitters, an identifiable signal may be transmitted from each of the transmitters using its distinct code information during one or more unallocated timeslots of the communications protocol. The simulcast communications signal may be digital television signals, such as digital video broadcasting—handheld (DVB-H) protocol signals, and the communications protocol may be a digital television protocol, such as the DVB-H protocol.

In some embodiments, the simulcast communication signals may include range assistance information, such as location and/or time correction data, respectively associated with each of the plurality of transmitters. Alternatively, the range assistance information may be transmitted from each transmitter along with its respective identifiable signal.

FIG. 4B is a flowchart illustrating an operations that may be performed by a mobile device, such as the mobile terminal 225 of FIG. 2, according to some embodiments of the present invention. Referring now to FIG. 4B, communication signals simulcast from a plurality of transmitters, such as the transmitters 120a-120c of FIG. 1, are received as a received simulcast communication signal at a mobile device (Block 415). One of the transmitters is then identified based on information obtained from the received simulcast communication signal (Block 420). For example, the information obtained from the received simulcast communication signal may be identification information associated with one of the transmitters, such as time slot and/or code information for that transmitter. An identifiable signal associated with the identified one of the transmitters is also received (Block 425), and a range of the identified transmitter from the mobile device is determined based on the received identifiable signal (Block 430).

In some embodiments, the information obtained from the received simulcast communication signal may also include identification information associated with additional ones of the transmitters. Where a large number of transmitters are present in the communications system, identification information for all of the transmitters may require a large portion of the simulcast communication signal. As such, identification information for only selected ones of the transmitters in the system may be included in the simulcast communication signal. In addition, the information obtained from the received simulcast communication signal may include range assistance information associated with ones of the transmitters. As the signal power of the communication signals simulcast from the transmitter is combined to provide the received simulcast communication signal at the receiver of the mobile device, the identification information and/or the range assistance information may be received with sufficient signal strength even if relatively weak signals from the respective transmitters are received at the receiver.

Figure 5A:
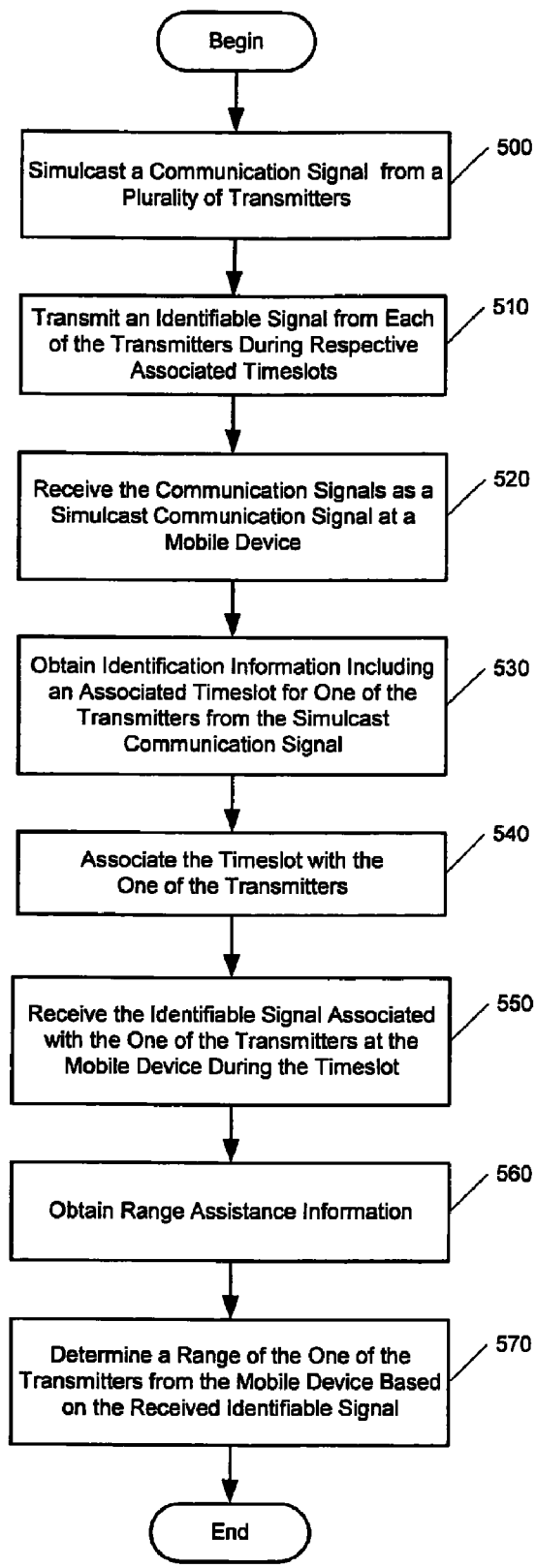
FIGS. 5A and 5B are flowcharts illustrating operations for determining the location of a mobile device based on simulcast communication signals according to further embodiments of the present invention.
Figure 5B:
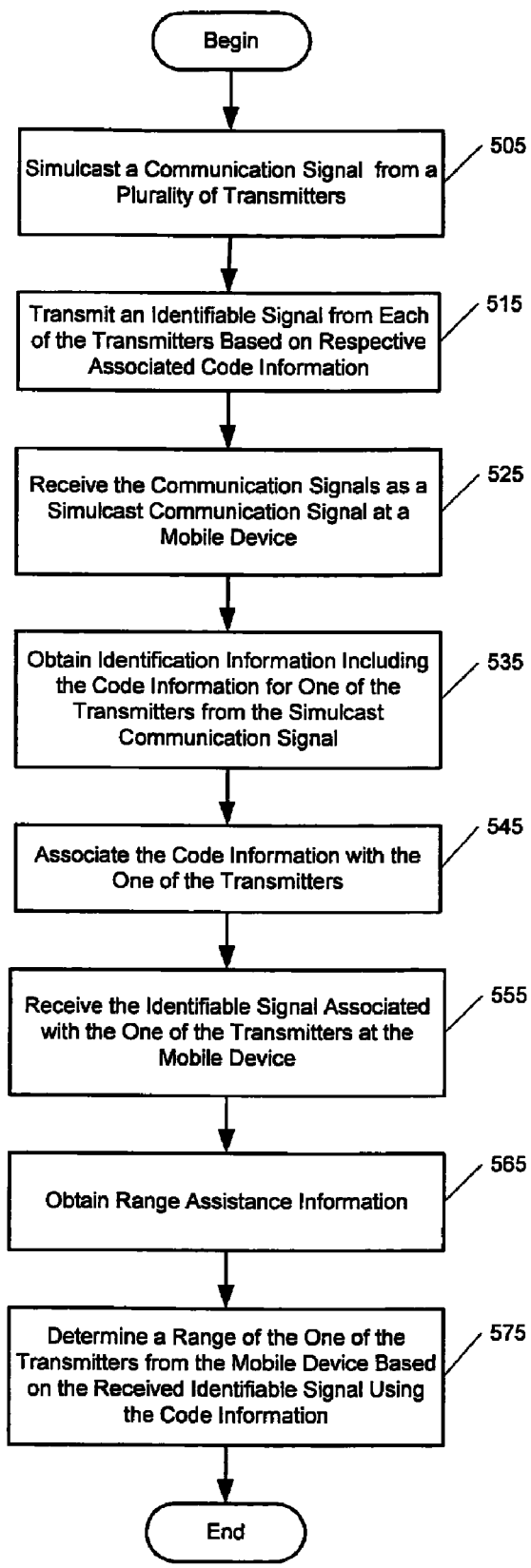

FIGS. 5A and 5B are flowcharts illustrating operations that may be carried out by systems for determining a location of a mobile device based on simulcast communication signals according to further embodiments of the present invention. Referring now to FIG. 5A, a communications signal, such as a DVB-H protocol signal, is simulcast from a plurality of transmitters (Block 500), and an identifiable signal is transmitted from each of the transmitters during respective associated timeslots designated by information in the simulcast communication signal (Block 510). Where the communication signal is a DVB-H protocol signal, the identifiable signals may be transmitted during unallocated timeslots of the DVB-H protocol.

The simulcast communication signals are received as a received simulcast communication signal at a mobile device (Block 520). In some embodiments, the mobile device receiver may not distinguish the simulcast communication signals from the plurality of transmitters as multiple signals; rather, the signal power of the respective simulcast communication signals may be combined to increase the signal strength of the received simulcast communication signal. In addition, although the simulcast communication signals from some of the transmitters may be time-shifted when received at the mobile device, such a time shift may be minimal in comparison to the data rate.

Identification information, including an associated timeslot for one of the transmitters, is obtained from the received simulcast communications signal (Block 530). The timeslot designated by the identification information is associated with the corresponding transmitter (Block 540). The identifiable signal associated with that transmitter is then received at the mobile device during the timeslot (Block 550), for example, by activating a receiver during the timeslot.

In some embodiments, the identification information obtained from the received simulcast communications signal may include a first time slot associated with a first transmitter, and a second time slot associated with a second transmitter. As such, after receiving the simulcast communication signal, the first time slot is associated with the first transmitter, and the second time slot is associated with the second transmitter. An identifiable signal is then received from the first transmitter during the first time slot, and an identifiable signal is received from the second transmitter during the second time slot. For example, where the mobile device is a mobile terminal, a controller of the mobile terminal may activate a receiver of the mobile terminal during the first and second timeslots to respectively receive the identifiable signals associated with the first and second transmitters.

Still referring to FIG. 5A, range assistance information, including location and/or time correction data for the one of the transmitters, may be obtained (Block 560). For example, range assistance information for one or more of the transmitters may be included in the received simulcast communication signal, and may be obtained therefrom by demodulating the simulcast communications signal. Alternatively, the range assistance information for the one of the transmitters may be obtained from the identifiable signal associated with that transmitter, for instance, by demodulating the received identifiable signal. Where multiple identifiable signals are received from respective multiple transmitters, each identifiable signal may include range assistance information for its associated transmitter.

A range of one of the transmitters from the mobile device is then determined based on the received identifiable signal and the range assistance information (Block 570). As such, when the range assistance information is included in the received identifiable signal, only the received identifiable signal may be used to determine the range of the transmitter. Where the range assistance information is obtained from the received simulcast signal, both the received identifiable signal and the received simulcast signal may be used to determine the range of the transmitter from the mobile device. The determined range may then be used, along with other determined range values to other transmitters having known locations, to estimate the position of the mobile device.

FIG. 5B is a flowchart illustrating operations for determining a location of a mobile terminal according to still further embodiments of the present invention. Referring now to FIG. 5B, a communications signal is simulcast from a plurality of transmitters (Block 505), and an identifiable signal is transmitted from one of the transmitters based on associated code information provided by the simulcast communication signal (Block 515). The simulcast communication signals may contain distinct code information for multiple transmitters, and as such, multiple identifiable signals may be transmitted at the same time using the respective code information. The simulcast communication signals are then received at the mobile device as a received simulcast communication signal (Block 525), and identification information, including the code information for at least one of the transmitters, is obtained from the received simulcast communications signal (Block 535). The code information is associated with the corresponding transmitter(s) (Block 545), and the identifiable signal for a respective transmitter is received at the mobile device and recognized based on the corresponding code information (Block 555). More particularly, identifiable signals from multiple transmitters may be concurrently received at the mobile device and recognized based on their respective code information. Range assistance information, such as location and/or time correction data for the transmitter(s), may also be obtained from the received simulcast communications signal and/or the identifiable signal(s) (Block 565), as described above with reference to FIG. 5A. The range of the transmitter(s) from the mobile device is then determined based on the received identifiable signal(s) using the corresponding code information (Block 575).

Where the received simulcast communication signal includes first and second code information respectively associated with first and second transmitters, the first code information may be obtained and associated with the first transmitter, and the second code information may be obtained and associated with the second transmitter. Identifiable signals may be concurrently received from the first and second transmitters, and a range of the first transmitter from the mobile device may be determined based on the first code information. Likewise, the range of the second transmitter may be determined based on the second code information. More specifically, first and second identifiable signals may be received from the first and second transmitters as a ranging signal during a common timeslot, such as an unallocated timeslot of a particular communications protocol. Then, a range of the first transmitter from the mobile device may be determined using the first code information based on the ranging signal, and the range of the second transmitter from the mobile device may be determined using the second code information based on the ranging signal.

The flowcharts, flow diagrams, and block diagrams of FIGS. 1-5 illustrate the architecture, functionality, and operations of possible implementations of systems, methods, and devices for determining the location of a mobile device based on simulcast communications signals according to some embodiments of the present invention. In this regard, each block in the flowcharts or block diagrams may represent a module, segment, or portion of code which comprises one or more executable instructions for implementing the specified logical acts. It should also be noted that, in some embodiments, the acts noted in the blocks may occur out of the order noted in the figures. For example, two blocks shown in succession may, in fact, be executed substantially concurrently, or the blocks may sometimes be executed in the reverse order, depending on the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A method for determining a position of a mobile device, the method comprising:
   receiving a digital television signal at the mobile device simulcast from a plurality of transmitters;
   identifying one of the plurality of transmitters based on information obtained from the received simulcast digital television signal, wherein the information comprises identification information associated with the one of the plurality of transmitters including a timeslot and/or code information associated therewith;
   receiving an identifiable signal associated with the identified one of the plurality of transmitters; and
   determining a range of the identified one of the plurality of transmitters from the mobile device based on the received identifiable signal.

2. The method of claim 1, wherein the information obtained from the received simulcast digital television signal further comprises identification information associated with additional ones of the plurality of transmitters.

3. The method of claim 1, wherein the identification information includes the timeslot, wherein identifying one of the plurality of transmitters comprises associating the timeslot with the one of the plurality of transmitters, and wherein receiving an identifiable signal comprises receiving the identifiable signal from the identified one of the plurality of transmitters during the timeslot.

4. The method of claim 3, wherein the one of the plurality of transmitters comprises a first one of the plurality of transmitters, wherein the information obtained from the received simulcast digital television signal comprises identification information associated with the first one of the plurality of transmitters including a first timeslot associated therewith and identification information associated with a second one of the plurality of transmitters including a second timeslot associated therewith, and further comprising:
- associating the second timeslot with the second one of the plurality of transmitters;
- receiving an identifiable signal from the second one of the plurality of transmitters during the second timeslot; and
- determining a range of the second one of the plurality of transmitters from the mobile device based on the received identifiable signal from the second one of the plurality of transmitters.

5. The method of claim 1, wherein the identification information includes the code information, wherein identifying one of the plurality of transmitters comprises associating the code information with the one of the plurality of transmitters, and wherein determining a range further comprises determining the range of the identified one of the plurality of transmitters based on the code information.

6. The method of claim 5, wherein the one of the plurality of transmitters comprises a first one of the plurality of transmitters, wherein the information obtained from the received simulcast digital television signal comprises identification information associated with the first one of the plurality of transmitters including first code information associated therewith and identification information associated with a second one of the plurality of transmitters including second code information associated therewith, and further comprising:
- associating the obtained second code information with the second one of the plurality of transmitters;
- receiving an identifiable signal from the second one of the plurality of transmitters; and
- determining a range of the second one of the plurality of transmitters from the mobile device based on the obtained second code information.

7. The method of claim 6, wherein receiving an identifiable signal from the first and second ones of the plurality of transmitters and determining a range of the first and second ones of the plurality of transmitters comprises:
- respectively receiving first and second identifiable signals from the first and second ones of the plurality of transmitters during a common timeslot as a ranging signal;
- determining the range of the first one of the plurality of transmitters from the mobile device using the first code information based on the received ranging signal; and
- determining the range of the second one of the plurality of transmitters from the mobile device using the second code information based on the received ranging signal.

8. The method of claim 1, wherein the information obtained from the received simulcast digital television signal further comprises range assistance information including location and/or time correction data for the one of the plurality of transmitters, and wherein determining a range comprises:
- determining a range of the identified one of the plurality of transmitters from the mobile device based on the received identifiable signal and the range assistance information.

9. The method of claim 1, wherein receiving an identifiable signal further comprises:
- obtaining range assistance information including location and/or time correction data for the identified one of the plurality of transmitters from the received identifiable signal.

10. The method of claim 1, further comprising:
- simulcasting the digital television signal from the plurality of transmitters; and
- transmitting the identifiable signal from the one of the plurality of transmitters.

11. A method for determining a position of a mobile device, the method comprising:
- receiving a digital television signal at the mobile device simulcast from a plurality of transmitters according to a communications protocol;
- identifying one of the plurality of transmitters based on information obtained from the received simulcast digital television signal;
- receiving an identifiable signal associated with the identified one of the plurality of transmitters during an unallocated portion of the communications protocol; and
- determining a range of the identified one of the plurality of transmitters from the mobile device based on the received identifiable signal.

12. The method of claim 11, wherein the simulcast digital television signal and the identifiable signal comprise digital video broadcasting-handhelds (DVB-H) protocol signals, and wherein receiving the identifiable signal comprises:
- receiving the identifiable signal during an unallocated timeslot of the DVB-H protocol.

13. The method of claim 12, further comprising:
- transmitting the determined range from the mobile device to a location server; and
- calculating the position of the mobile device at the location server using at least three range values including the determined range from the mobile device to provide a position estimate based on the DVB-H protocol signals.

14. The method of claim 12, further comprising:
- receiving the DVB-H protocol signals and a GPS communication signal at the mobile device during respective distinct timeslots using a common receiver without retuning an antenna circuit associated therewith; and
- estimating the position of the mobile terminal based on the DVB-H protocol signals and the GPS communication signal.

15. The method of claim 14, wherein the information obtained from the received simulcast digital television signal further comprises GPS assistance information.

16. A method for determining a position of a mobile device, the method comprising:
- simulcasting a communication signal from a plurality of transmitters, wherein the simulcast communication signal designates a timeslot associated with one of the plurality of transmitters;
- receiving the simulcast communication signal at the mobile device;
- identifying the one of the plurality of transmitters based on information obtained from the received simulcast communication signal;
- transmitting an identifiable signal from the one of the plurality of transmitters during the timeslot;
- receiving the identifiable signal associated with the identified one of the plurality of transmitters; and
- determining a range of the identified one of the plurality of transmitters from the mobile device based on the received identifiable signal.

17. A method for determining a position of a mobile device, the method comprising:
- simulcasting a communication signal from a plurality of transmitters, wherein the simulcast communication signal designates code information associated with one of the plurality of transmitters;

receiving the simulcast communication signal at the mobile device;

identifying the one of the plurality of transmitters based on information obtained from the received simulcast communication signal;

transmitting an identifiable signal from the one of the plurality of transmitters based on the code information;

receiving the identifiable signal associated with the identified one of the plurality of transmitters; and determining a range of the identified one of the plurality of transmitters from the mobile device based on the received identifiable signal.

18. A mobile device, comprising:

a receiver configured to receive a digital television signal simulcast from a plurality of transmitters and an identifiable signal associated with one of the plurality of transmitters; and a controller configured to identify the one of the plurality of transmitters based on information obtained from the received simulcast digital television signal, wherein the information comprises identification information associated with the one of the plurality of transmitters including a timeslot and/or code information associated therewith, and configured to determine a range of the one of the plurality of transmitters from the mobile device based on the received identifiable signal.

19. The mobile device of claim 18, wherein the identification information includes the timeslot, and wherein the controller is further configured to associate the timeslot with the one of the plurality of transmitters and activate the receiver during the timeslot to receive the identifiable signal from the identified one of the plurality of transmitters.

20. The mobile device of claim 18, wherein the identification information includes the code information, and wherein the controller is further configured to associate the code information with the one of the plurality of transmitters and determine the range of the one of the plurality of transmitters based on the code information.

21. The mobile device of claim 18, wherein the controller is further configured to obtain range assistance information including location and/or time correction data for the one of the plurality of transmitters from the received simulcast communication signal, and configured to determine the range based on the received identifiable signal and the range assistance information.

22. The mobile device of claim 18, wherein the controller is further configured to obtain range assistance information including location and/or time correction data for the identified one of the plurality of transmitters from the received identifiable signal.

23. The mobile device of claim 18, wherein the simulcast digital television signal and the identifiable signal comprise digital video broadcasting-handhelds (DVB-H) protocol signals, and wherein the controller is configured to activate the receiver during an unallocated timeslot of the DVB-H protocol to receive the identifiable signal.

* * * * *